(12) United States Patent
Cho et al.

(10) Patent No.: US 8,159,967 B2
(45) Date of Patent: Apr. 17, 2012

(54) WIRELESS COMMUNICATION USING BEAM FORMING AND DIVERSITY

(75) Inventors: James Cho, Santa Clara, CA (US); Paul J. Husted, San Jose, CA (US)

(73) Assignee: Qualcomm Atheros, Inc., San Jose, CA (US)

(*) Notice: Subject to any disclaimer, the term of this patent is extended or adjusted under 35 U.S.C. 154(b) by 36 days.

(21) Appl. No.: 12/404,571

(22) Filed: Mar. 16, 2009

(65) Prior Publication Data

US 2009/0175383 A1    Jul. 9, 2009

Related U.S. Application Data

(62) Division of application No. 10/985,636, filed on Nov. 10, 2004, now Pat. No. 7,525,926.

(60) Provisional application No. 60/598,312, filed on Aug. 2, 2004.

(51) Int. Cl.
  *H04J 1/16* (2006.01)
  *H04J 3/16* (2006.01)
  *H03C 7/02* (2006.01)
(52) U.S. Cl. .................. 370/252; 370/465; 455/101
(58) Field of Classification Search .................. None
See application file for complete search history.

(56) References Cited

U.S. PATENT DOCUMENTS

| | | | | |
|---|---|---|---|---|
| 5,028,931 A | | 7/1991 | Ward | |
| 5,530,926 A | * | 6/1996 | Rozanski | 455/277.2 |
| 5,561,673 A | * | 10/1996 | Takai et al. | 714/708 |
| 5,952,963 A | * | 9/1999 | Shen et al. | 342/367 |
| 5,991,613 A | * | 11/1999 | Euscher et al. | 455/277.1 |
| 6,031,877 A | | 2/2000 | Saunders | |
| 6,049,705 A | * | 4/2000 | Xue | 455/277.1 |
| 6,330,433 B1 | * | 12/2001 | Jager | 455/277.2 |
| 6,346,910 B1 | | 2/2002 | Ito | |
| 6,347,234 B1 | | 2/2002 | Scherzer | |
| 6,380,892 B1 | | 4/2002 | Choi et al. | |
| 6,400,780 B1 | | 6/2002 | Rashid-Farrokhi et al. | |
| 6,453,177 B1 | | 9/2002 | Wong et al. | |
| 6,498,804 B1 | | 12/2002 | Ide et al. | |
| 6,505,037 B1 | | 1/2003 | Kandala | |
| 6,597,733 B2 | | 7/2003 | Pollmann et al. | |
| 6,639,551 B2 | | 10/2003 | Li et al. | |
| 6,697,619 B1 | | 2/2004 | Hogberg et al. | |
| 6,847,810 B2 | * | 1/2005 | Shen et al. | 455/277.2 |
| 6,961,545 B2 | * | 11/2005 | Tehrani et al. | 455/101 |
| 7,016,437 B2 | | 3/2006 | Denno | |
| 7,099,380 B1 | * | 8/2006 | Feng et al. | 375/150 |

(Continued)

FOREIGN PATENT DOCUMENTS

EP   0 622 911 B1   8/2002

*Primary Examiner* — Nittaya Juntima
(74) *Attorney, Agent, or Firm* — Bever, Hoffman & Harms, LLP

(57) ABSTRACT

A method and apparatus for wirelessly transmitting real-time data streams is described. To ensure continuous data flow, fast diversity and slow diversity can be used. Fast diversity chooses a receive antenna based on received signal parameters, such as signal strength, during the transmission header and prior to information transfer. Slow diversity stores received signal parameters from previous packets, associates the parameters with a selected antenna, and uses the parameter history to denote a "default" antenna. Additionally, receive and/or transmit beam forming can be used to maintain continuous communication between stations. Beam forming, which combines antenna signals to maximize performance, is possible when at least two transmit/receive signal processing chains are available.

8 Claims, 6 Drawing Sheets

U.S. PATENT DOCUMENTS

| | | |
|---|---|---|
| 7,359,692 B2 * | 4/2008 | Saed et al. ................. 455/277.1 |
| 7,542,450 B2 * | 6/2009 | Li et al. .......................... 370/335 |
| 2002/0164963 A1 | 11/2002 | Tehrani et al. |
| 2003/0228857 A1 | 12/2003 | Maeki |
| 2005/0078763 A1 | 4/2005 | Choi et al. |
| 2005/0287978 A1 | 12/2005 | Maltsev et al. |

* cited by examiner

WIRELESS COMMUNICATION USING BEAM FORMING AND DIVERSITY

RELATED APPLICATIONS

This application is a divisional of U.S. patent application Ser. No. 10/985,636, entitled "Wireless Communication Using Beam Forming And Diversity" filed Nov. 10, 2004, now U.S. Pat. No. 7,525,926, which issued on Apr. 28, 2009, which claims priority of U.S. Provisional Patent Application 60/598,312, entitled "Wireless Communication Using Beam Forming And Diversity" filed Aug. 2, 2004.

BACKGROUND OF THE INVENTION

1. Field of the Invention

The present invention relates to wireless networking and, more particularly, to wireless networking wherein at least one transceiver is equipped with multiple antennas.

2. Description of the Related Art

In wireless networking devices, especially those designed to support real-time media transport, uninterrupted, high-quality high-speed data transport must be maintained. Wireless data transport systems often must overcome interference, such as multipath (i.e. wherein objects in the environment can reflect a transmitted wireless signal) and spot sources of noise (e.g. wireless phones). Because any interference may have rapidly changing parameters, a system that uses a single transmit antenna and a single receive antenna is limited in its ability to mitigate interference.

To overcome this problem, a system can include multiple receive and/or transmit antennas and use antenna "diversity" to select optimal antennas. Specifically, such a system can select optimal antennas by transmitting/receiving on various combinations of receive/transmit antennas and analyzing the results of such transmitting/receiving.

Wireless data transport systems typically comprise at least two transceivers, wherein each transceiver can include a transmitter and a receiver. When communicating according to, for example, the IEEE 802.11 family of standards, each transceiver may be, in turn, a receiver or a transmitter, but not both simultaneously. When two or more transceivers communicate, they may be considered "communication partners," assuming alternately the role of transmitter or receiver.

In one embodiment, a receiver may select between two antennas connected to a single receive chain (i.e. receiver components capable of receiving and processing a transmitted signal) based on a received signal characteristic associated with each of the two selectable antennas. Such signal characteristics may include a received signal strength indication (RSSI) and a bit error rate. In one embodiment, the signal characteristics may be determined by processing empirical (generally called "history") data (e.g. receiving a plurality of transmissions, wherein at least one transmission is received by each antenna, and analyzing the history data in such transmissions)(called "slow diversity" herein). In another embodiment, the signal characteristics may be determined by changing the antenna selection during the reception of a packet (i.e. selecting different antennas during the transmission of a single packet)(called "fast diversity" herein). In yet another embodiment, a hybrid approach may be used. For example, signal characteristics from the second antenna may be gathered briefly during the reception of a packet, and history data for the second antenna created thereby, with reception continuing on the first antenna.

In another embodiment, if a receiver has two antennas, e.g. R1 and R2, and a transmitter has two antennas, e.g. T1 and T2, then the 4 possible antenna combinations include: R1/T1, R2/T2, R1/T2, and R2/T1. Based on any number of performance characteristics, one of these antenna combinations may be better than the others.

In another system, at least two (receive or transmit) antennas operate simultaneously through parallel receive or transmit "chains" (respectively), to perform "beam forming", wherein antenna signals are combined to maximize performance. An example of beam forming by receiver combining is disclosed in U.S. patent application Ser. No. 10/682,787, entitled "Apparatus and Method of Multiple Antenna Receiver Combining of High Data Rate wideband Packetized Wireless Communication Signals", filed on Oct. 8, 2003, now U.S. Pat. No. 7,366,089, which issued on Apr. 29, 2008, as well as U.S. patent application Ser. No. 10/682,381, entitled "Apparatus and Method of Multiple Antenna Transmitter Beamforming of High Data Rate . . . Signals", also filed on Oct. 8, 2003, now U.S. Pat. No. 7,385,914, which issued on Jun. 10, 2008, both of which are incorporated herein by reference. In yet another system, each of the parallel receive or transmit chains may be equipped with a plurality of selectable antennas, thereby permitting a combination of the diversity and beam forming techniques. Note that the terms "multiple receiver combining" (MRC) and "receive beam forming" are used interchangeably herein.

Unfortunately, switching between antenna combinations and/or the analysis of optimal antenna combinations can result in service interruptions. Such interruptions, for a system transporting real-time streaming media, could result in the loss of picture from a television program or the loss of sound from a radio program. Therefore, a need arises for a means of controlling a wireless communication system having multiple receive and/or transmit antennas to avoid interrupting a real-time communication flow.

SUMMARY OF THE INVENTION

A method and apparatus for wirelessly transmitting real-time data streams is provided. To ensure continuous data flow, fast diversity and slow diversity can be used. Fast diversity chooses a receive antenna based on received signal parameters, such as signal strength, during receipt of the transmission header and prior to information transfer. Slow diversity stores received signal parameters from previous packets, associates the parameters with a selected antenna, and may use the parameter history to denote a "default" antenna.

Additionally, receive and/or transmit beam forming can be used to maintain continuous communication between stations. Beam forming, which combines antenna signals to maximize performance, is possible when at least two transmit/receive signal processing chains are available.

In accordance with one aspect of the invention, a method of updating beam forming coefficients in a receiver is provided. In this method, certain predetermined conditions must be met before the beam forming coefficients are updated. These predetermined conditions can include a received frame being valid (e.g. having a valid frame check sequence), the received frame not being a multicast frame (wherein the term "multicast" as used herein denotes non-unicast frames, including multicast and broadcast frames), a transmitter address in the received frame being found in a key cache of the receiver, and beam forming being enabled.

If all the predetermined conditions are met, then the beam forming coefficients can be updated based on enabled coefficient update bits. Otherwise, the beam forming coefficients are not updated.

Updating can include determining which coefficient update bits (that correspond to types of received frames), if any, are enabled. In one embodiment, four bits are provided for each of sixty-four frame types. For example, a first 4-bit combination could enable updating coefficients for normal frames with a valid timing synchronization function (TSF), a second 4-bit combination could enable updating coefficients for self-generated frames with a valid TSF, a third 4-bit combination could enable updating coefficients for normal frames with an expired TSF, and a fourth 4-bit combination could enable updating coefficients for self-generated frames with an invalid TSF.

Other predetermined conditions can include a beam forming static bit being cleared (thereby allowing beam forming parameters to be updated) or a beam forming coefficient multicast bit being cleared. In one embodiment, the above-described predetermined conditions can be determined using hardware operations.

In accordance with another aspect of the invention, a method of enabling transmit beam forming coefficients in a transmitter is provided. This method can also include determining whether predetermined conditions are met. One predetermined condition can include whether a unicast frame is to be transmitted, or beam forming for a multicast/broadcast transmission is allowed and a frame is a multicast/broadcast frame. Another predetermined condition can include gain modifications to each of N channels are enabled. Yet another predetermined condition can include that default parameters are not selected and the frame is not multicast.

If any of the predetermined conditions are not met, then beam forming on transmit is not performed. In contrast, if the predetermined conditions are met, then beam forming on transmit can be performed based on enabled coefficient update bits. Updating can include determining which coefficient update bits (that correspond to types of received frames), if any, are enabled. In one embodiment, four bits are provided for each of sixty-four frame types. For example, a first bit 4-bit combination could enable transmit coefficients for normal frames, a second 4-bit combination could enable transmit coefficients for auto-generated response frames, a third 4-bit combination could enable transmit coefficients for generated frames, and a fourth 4-bit combination could enable transmit coefficients for multicast frames.

In accordance with yet another aspect of the invention, a beam forming lookup chain in a receiver is provided. The beam forming lookup chain can include a key cache, a coefficient aging table, and a coefficient cache. The key cache can store a first plurality of entries, wherein each entry can include at least transmit antenna data, receive acknowledgement antenna data, transmitter address data, and a beam forming enable bit. The coefficient aging table can store a second plurality of entries, wherein each entry can include at least coefficient aging table valid data, key cache index data, and timestamp data. The coefficient cache can store a third plurality of entries associated with each receive chain, wherein each entry can include beam forming coefficients.

Notably, a transmitter address of a received packet is compared to transmitter address data in the key cache. A transmitter address match and a beam forming enable bit associated with the transmitter address data being set (thereby allowing beam forming) yields a key cache index. This key cache index can then be compared to the key cache index data in the coefficient aging table. A matching, valid, non-expired key cache index in the coefficient aging table indicates a corresponding entry in the coefficient cache. In one embodiment, the key cache has significantly more entries than the coefficient aging table, whereas the coefficient aging table and the coefficient cache have an identical number of entries. Using this configuration, if a match for the transmitter address is not found in the key cache, then the coefficient aging table need not be searched, thereby ensuring a time efficient process.

In accordance with yet another aspect of the invention, a method of switching transmit antennas in a station is provided. In this method, a current transmit antenna as well as a potential transmit antenna in the station can be identified. Advantageously, the potential transmit antenna can be used as a receive antenna for an acknowledgement signal based on a signal sent by the current transmit antenna. If the potential transmit antenna successfully receives the acknowledgement signal, then the potential transmit antenna can be designated as the new transmit antenna.

In accordance with yet another aspect of the invention, a method for selecting an antenna based on signal strength is provided. Specifically, if a received signal is very strong, then a default antenna can be selected. In one embodiment, a signal is very strong if, during reception, a number of large gain decrease steps (e.g. three) are made. The default antenna can be determined using slow diversity.

On the other hand, if the received signal is not very strong, then parameters associated with the received signal can be collected using the receiving antennas. If a difference in the parameters measured from an alternate antenna is greater than a threshold value, then an alternate antenna can be selected. The parameters can be collected using fast diversity. If the difference in the parameters measured from the alternate antenna is not greater than the threshold value, then the default antenna can be selected.

In one embodiment, the threshold value can be set to bias selecting the default antenna. For example, the threshold value can be set higher if beam forming has been enabled. A higher threshold setting can be selected such that increased signal parameters are sufficient to overcome suboptimal performance of using beam forming parameters for a wrong receiving antenna.

DETAILED DESCRIPTION OF THE FIGURES

Wirelessly transmitting real-time data streams is increasingly desired. Unfortunately, interference can disrupt such continuous data streams. Because any interference may have rapidly changing parameters, a system that uses a single transmit antenna and a single receive antenna is limited in its ability to mitigate interference.

To ensure continuous data flow, fast diversity and slow diversity can be used. Fast diversity chooses a receive antenna based on received signal parameters, such as signal strength, during the transmission header and prior to information transfer. Slow diversity stores received signal parameters from previous packets, associates the parameters with a selected antenna, and may use the parameter history to denote a "default" antenna.

Additionally, receive and/or transmit beam forming can be used to maintain continuous communication between stations. Beam forming, which combines antenna signals to maximize performance, is possible when at least two transmit/receive signal processing chains are available.

Figure 1:
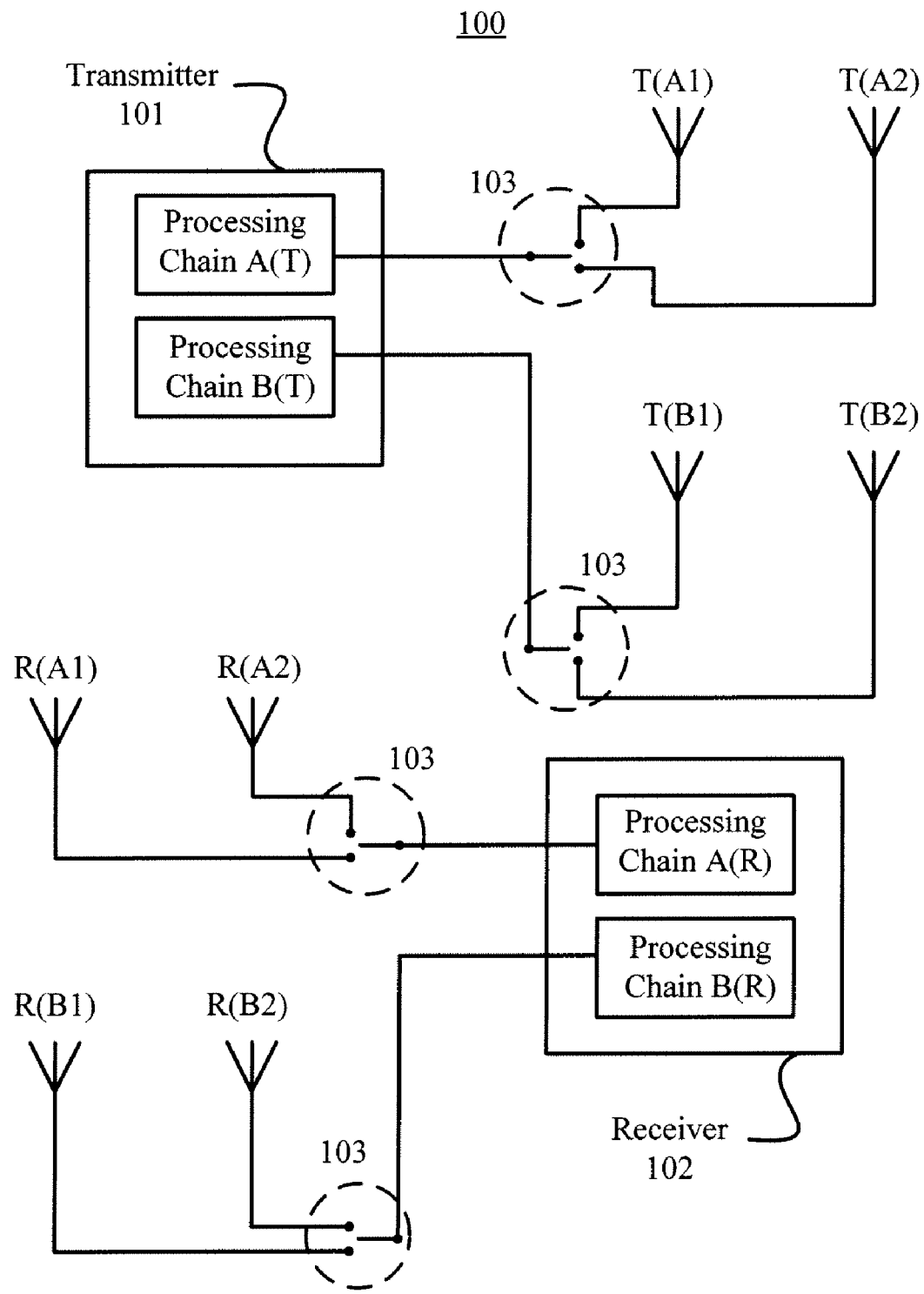
FIG. 1 illustrates an exemplary system including a receiver and a transmitter, wherein each station has four antennas and two associated signal-processing chains.

FIG. 1 illustrates an exemplary wireless communication system 100 including a transmitter 101 and a receiver 102. In this embodiment, transmitter 101 has two signal processing chains, i.e. processing chain A(T) and processing chain B(T). Each chain can be connected through a diversity switch 103 to one of two antennas. For example, processing chain A(T) can be connected via diversity switch 103 to either transmit antenna T(A1) or transmit antenna T(A2). Receiver 102 also has two signal-processing chains, i.e. processing chain A(R) and processing chain B(R). Each chain can be connected through a diversity switch 103 to one of two antennas. For example, processing chain B can be connected via diversity switch 103 to either receive antenna R(B1) or receive antenna R(B2).

Note that a typical wireless communication system can include a transceiver, which is a station capable of receiving and transmitting radio frequency (RF) signals. For simplification herein, reference to a "transmitter" or a "receiver" can also describe a functional role assumed by the transceiver for some period of time. Thus, for example, if transmitter 101 and receiver 102 form a transceiver, then transmitter antenna T(A1) and receive antenna R(A1) could be the same antenna performing transmit and receive functions at different points in time. In this case, processing chains A(T) and A(R) can also be the same processing chain performing transmit and receive functions, as appropriate.

In one embodiment, logic contained in transmitter 101 and receiver 102 can control diversity switches 103. This logic can include a protocol control unit (PCU) and a baseband processor. In turn, each of these devices can comprise associated random-access memory (RAM), which may be organized into tabular form.

Figure 2:
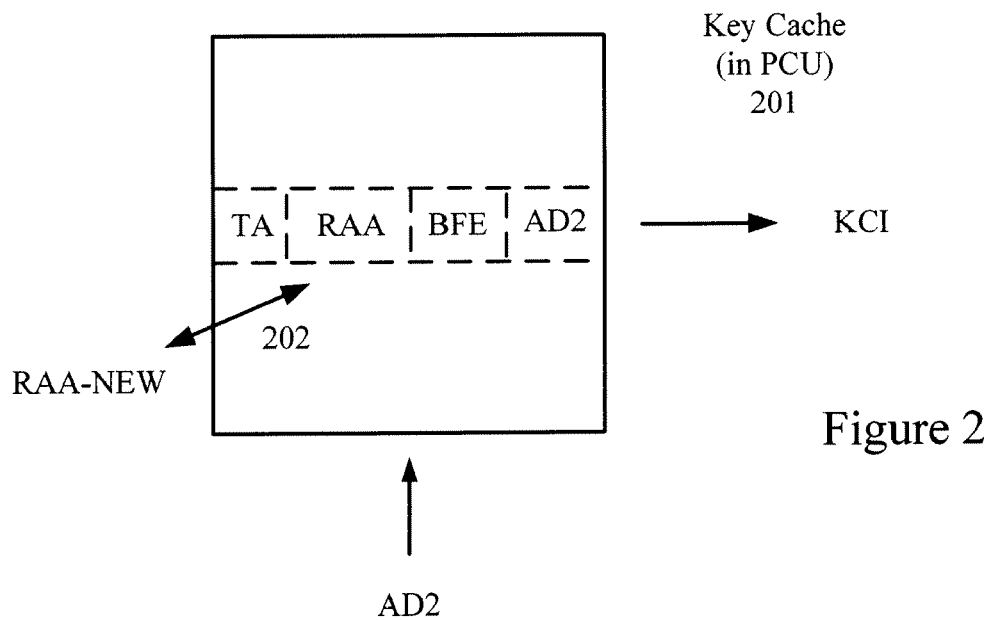
FIG. 2 illustrates a receiver cache memory being accessed by a key, wherein the key is the transmitter address.
Figure 3:
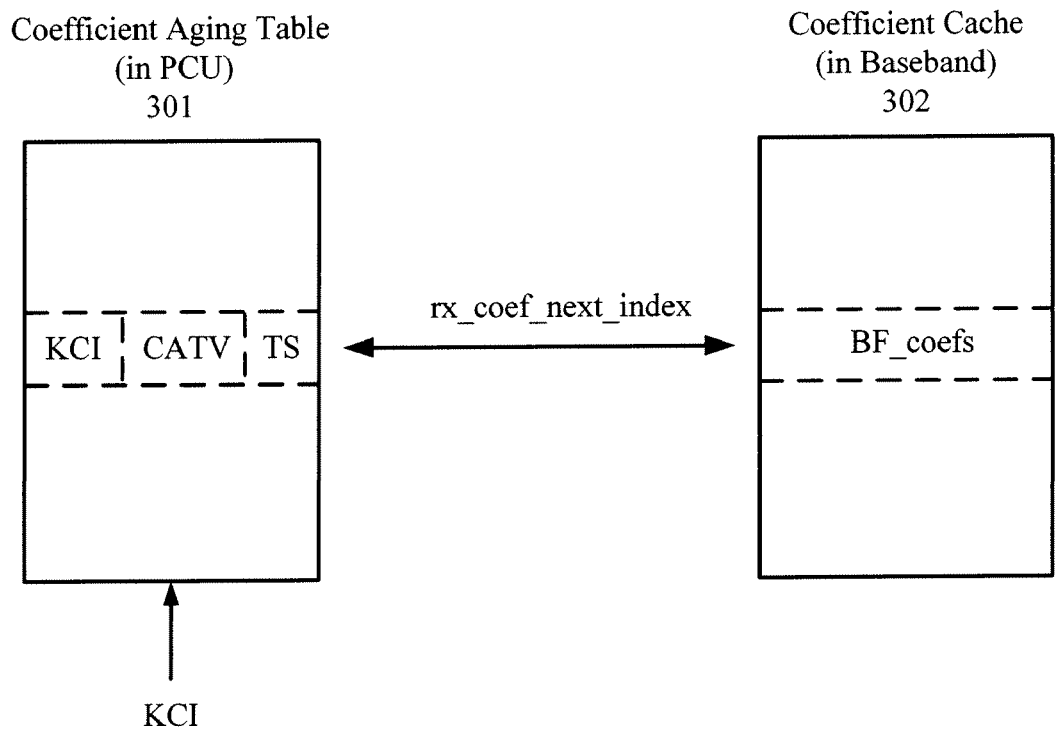
FIG. 3 illustrates a receiver data structure that can be indexed by the cache memory lookup operation of FIG. 2 and yield beam forming coefficients.

FIGS. 2 and 3 illustrate a beam forming lookup chain that can be implemented in a receiver. For convenience, Table 1 maps the acronyms used in reference to FIG. 2 and FIG. 3 with their respective meanings.

TABLE 1

Memory Acronyms

| Acronym | Meaning |
| --- | --- |
| AD2 | Transmitter address |
| BF_coefs | Beam forming coefficients |
| BFE | Beam forming enable |
| CATV | Coefficient aging table valid |
| KCI | Key cache index |
| RAA | Receive ACK antenna |
| TA | Transmit antenna |
| TS | Timestamp |

FIG. 2 specifically illustrates a memory layout in PCU RAM for storing a key cache 201 associated with the beam forming process. In this embodiment, key cache 201 can store at least a beam forming enable (BFE) bit, receive ACK antenna (RAA) data, transmit antenna (TA) data, and transmitter address (AD2) data. These bits can form an "entry" in key cache 201. Note that other embodiments of key cache 201 may include other data for each entry.

The BFE bit indicates whether beam forming for a receive/transmit beam is enabled. The RAA data identifies the antenna that will be used to receive an acknowledgement signal. The TA data identifies the antenna that will be used to transmit a signal and receive signals other than an acknowledgement signal. Thus, the BFE bit, the RAA data, and the TA data are "station-centric", i.e. information regarding the receiver having key cache 201. In contrast, the AD2 data indicates the MAC address of another station communicating with the receiver (i.e. the transmitter at that point in time).

After the PCU receives a packet, the PCU can search key cache 201 for an entry whose address matches the transmitter address (AD2) in the received packet. Thus, the transmitter address AD2 in the received packet functions as a "key" to key cache 201. If the transmitter address (AD2) is found and the associated beam forming enable (BFE) bit in the entry is set, then the location of the matching data (i.e. location of the entry) in key cache 201 forms the key cache index (KCI). In one embodiment, key cache 201 can include 128 entries. In other embodiments, key cache 201 may include fewer or more entries.

FIG. 3 illustrates a memory layout for a coefficient aging table 301 and a coefficient cache 302. In this embodiment, an entry in coefficient aging table 301 can include coefficient aging table valid (CATV) data, the key cache index (KCI) data, and timestamp (TS) data. After the PCU receives a packet and generates KCI data (see FIG. 2), the PCU can search coefficient aging table 301 for a matching, valid KCI (wherein the validity is indicated by its associated coefficient aging table valid (CATV) entry).

In one embodiment, coefficient aging table 301 can include 8 entries. In other embodiments, coefficient aging table 301 may include fewer or more entries. However, in accordance with one aspect of the invention, coefficient aging table 301 can advantageously include significantly fewer entries than key cache 201.

The address of the valid, matching entry in coefficient aging table 301 can be advantageously used as an index to coefficient cache 302 (which is stored in the baseband processor RAM). In one embodiment, the number of entries in coefficient aging table 301 and coefficient cache 302 can be the same. The beam forming coefficients (BF_coefs) stored in coefficient cache 302 can include the weights and control data described in the above-referenced U.S. patent application Ser. No. 10/682,787, now U.S. Pat. No.7,366,089, which issued on Apr. 29, 2008, entitled "Apparatus and Method of Multiple Antenna Receiver Combining of High Data Rate wideband Packetized Wireless Communication Signals". For example, in one embodiment, an entry for coefficient cache 302 could include I and Q weights of 8 bits each for each of 52RF carriers, plus 4 additional beam forming coefficients controlling DAC gain and output power control.

Note that if the PCU fails to find a matching key cache index (KCI) in coefficient aging table 301, then the entry in coefficient aging table 301 currently associated with the rx_coef_next_index (a register used to point to an entry in coefficient aging table 301 and the associated entry in coefficient cache 302) can be invalidated by clearing the CATV flag. In one embodiment, the PCU can also clear the CATV flag if the timestamp TS, when compared to a current time, indicates that the entry being read is older than a predetermined age. Thus, even if there is a matching KCI in the coefficient aging table 301, the entry for that KCI may be expired. The rx_coef_next_index provided to the baseband processor may be an expired entry (e.g. the matching entry having a timestamp being closest to the current time) or an invalid entry. The next rx_coef_next_index will be the first invalid or expired entry. If there are no invalid or expired entries, then the oldest entry can be used for the rx_coef_next_index. In one embodiment, the timestamp data can include 24 bits with the least significant bit (lsb) representing 1 time unit (TU)(wherein the TU may represent 1 elapsed microsecond (μs)).

Figure 4:
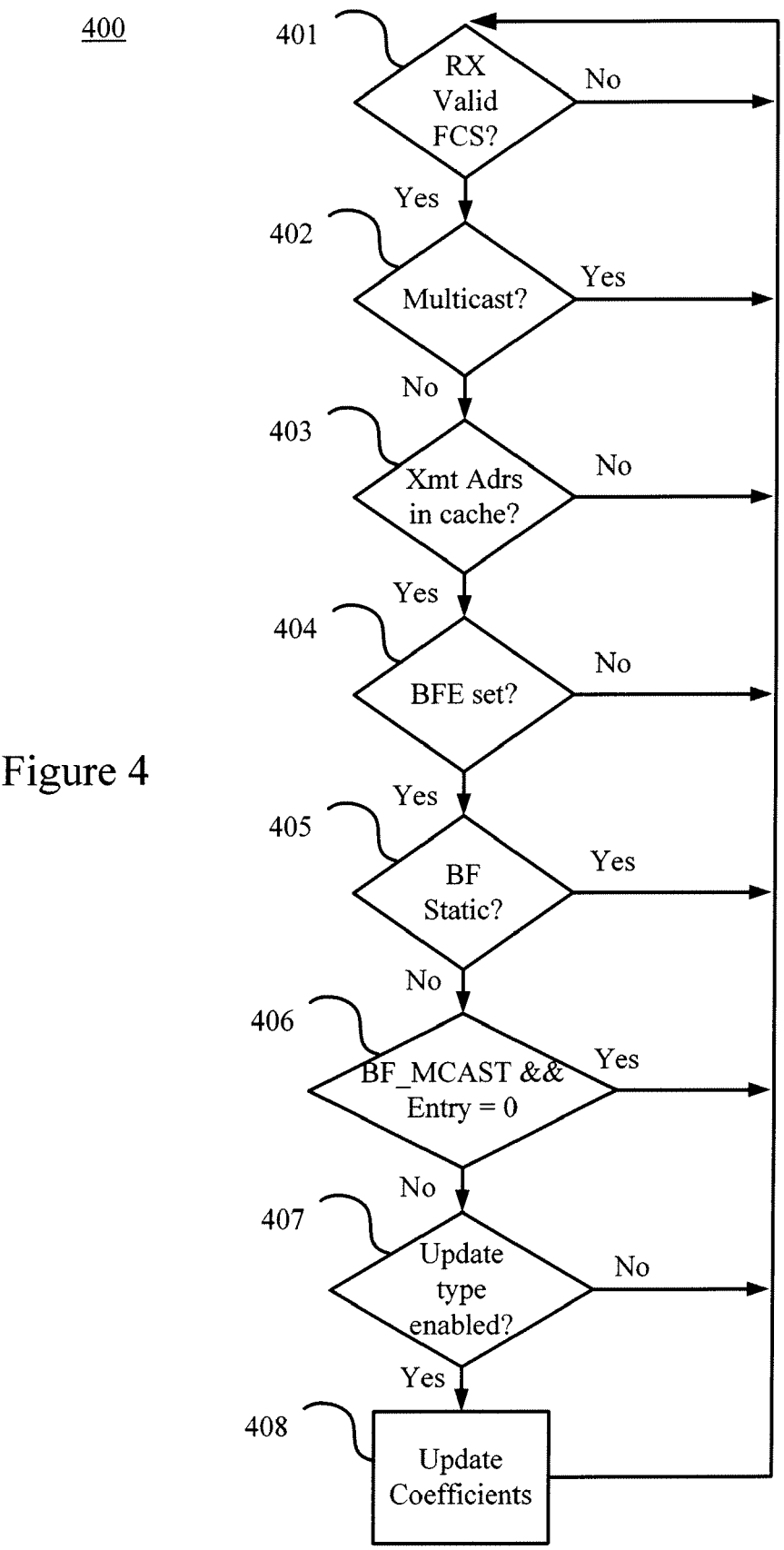
FIG. 4 illustrates an exemplary technique for updating receive beam forming parameters.

FIG. 4 illustrates a flow chart 400 for updating receive beam-forming coefficients. Note that for each received packet, the baseband processor can create a set of beam forming coefficients. Steps 401-407 can be advantageously used to determine whether the beam forming coefficients (BF_coefs) in the coefficient cache should be updated. In this embodiment, the receive beam forming coefficients can be updated only if certain conditions are met. For clarification, the beam forming lookup chain, shown in FIGS. 2 and 3, is referenced.

For example, step 401 determines if a received (RX) frame has a valid frame check sequence (FCS)(i.e. beam-forming coefficients should not be updated based on a "bad" packet). If the RX frame has a valid FCS, then step 402 determines if the RX frame is multicast (e.g. if the first address matches that station's address). Note that if the frame is multicast, then multiple stations are receiving the transmitted signal, wherein each station could have different beam forming parameters. Therefore, if the frame is multicast, then the receiver should not update the beam forming coefficients based on that frame.

If the RX frame is not multicast, then step 403 determines if the transmitter address (AD2) is found in key cache 201. If the transmitter address (AD2) is found in key cache 201, then step 404 determines if the beam forming enable (BFE) bit is set. Note that if the BFE bit is not set for an entry corresponding to a matching transmitter address (AD2) in key cache 201, then neither coefficient aging table 301 nor coefficient cache 302 need be accessed, thereby saving valuable time in this beam forming update technique.

If the BFE bit is set, then step 405 determines if the beam forming coefficient static (BF_COEF_STATIC) bit, which inhibits updates, is cleared. In one embodiment, this BF_COEF_STATIC bit, as well as the BFE bit, a BF_Mcast bit (described below), and a beam forming coefficient threshold (BF_COEF_TSF_THRESH) bit) can be stored in a beam forming coefficient mode register accessed by the PCU.

If the BF_COEF_STATIC bit is not cleared, then step 406 determines if a beam forming coefficient multicast (BF_Mcast) bit is set. Note that one of the entries in coefficient cache 302 can be reserved for beam forming a multicast frame using default gains for the receiver. If the beam forming coefficient multicast (BF_Mcast) bit is set, then the reserved entry, e.g. entry 0, stores this default information and the receiver will use this default information. Thus, if the BF_Mcast bit is set, then updating the beam forming coefficients is unnecessary.

If the BF_Mcast bit is not set, then step 407 determines which coefficient update bits are set. In one embodiment, there are 4 bits for each of the 64 frame types. Exemplary frame types/subtypes are described in §7.1.3.1.2 of the IEEE-802.11-1997 spec document and, particularly, Table 1. For example, a first bit (BFCOEF_RX_UPDATE_TSF_VAL_NORMAL) could enable updating coefficients for normal frames with a valid timing synchronization function (TSF), a second bit (BFCOEF_RX_UPDATE_TSF_VAL_SELF_GEN) could enable updating coefficients for self-generated frames (i.e. self-generated response frames to transmitted frames) with a valid TSF, a third bit (BFCOEF_RX_UPDATE_TSF_EXP_NORMAL) could enable updating coefficients for normal frames with an expired TSF, and a fourth bit (BFCOEF_RX_UPDATE_TSF_EXP_SELF_GEN) could enable updating coefficients for self-generated frames with an invalid TSF.

If all the predetermined conditions (as determined by steps 401-406) were met) and beam forming for at least one frame type is enabled (step 407), then step 408 updates the coefficients in the manner directed by step 407. Notably, if any condition is not met (steps 401-406) or if beam forming for no frame types are enabled (step 407), then the process immediately returns to step 401 until the next frame is received. Note that the terms "frame" and "packet" are used interchangeably herein.

Figure 5:
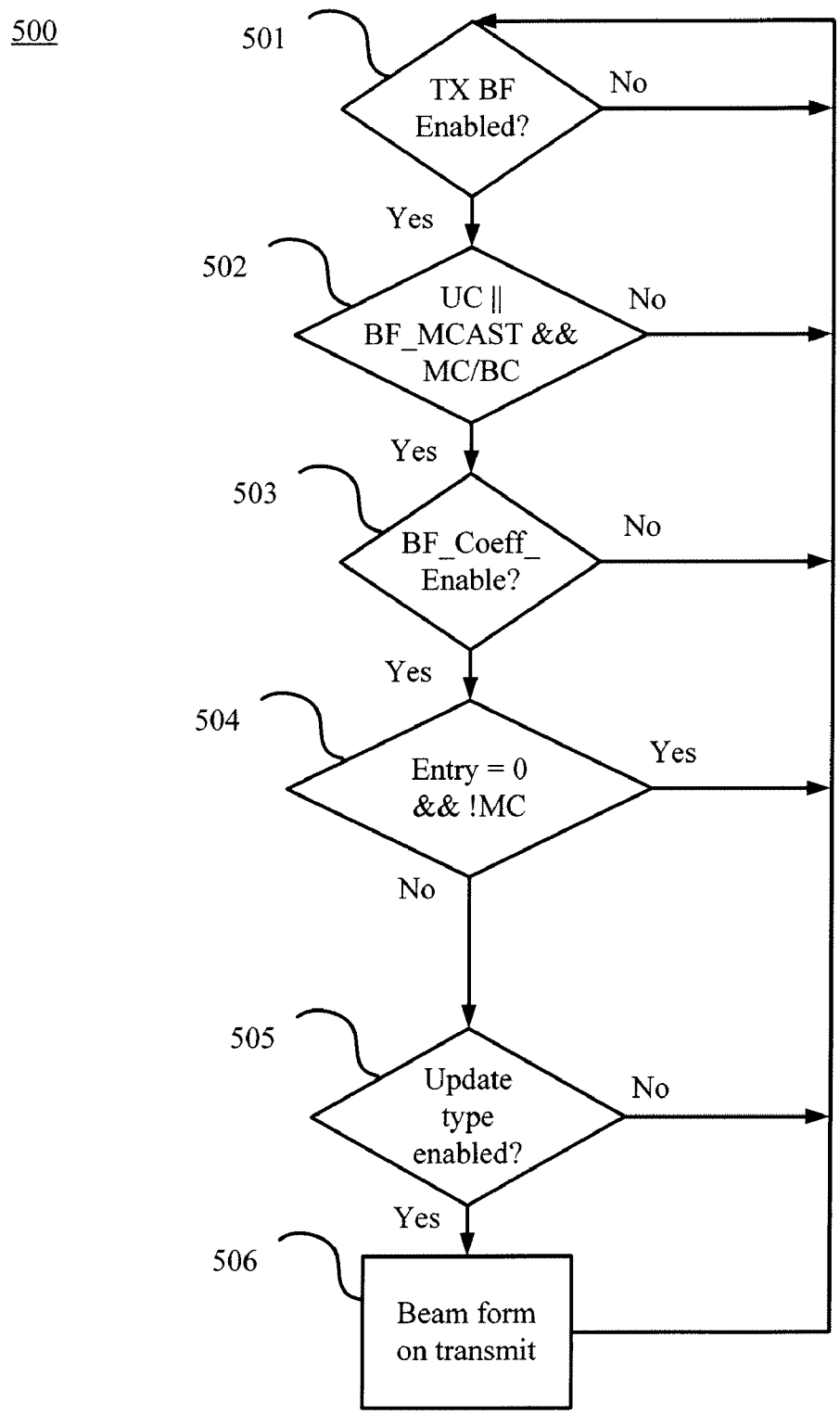
FIG. 5 illustrates an exemplary technique for enabling transmit beam forming.

FIG. 5 illustrates an exemplary enabling transmit beam forming coefficients technique 500. In this embodiment, the transmit beam forming coefficients can be enabled only if certain conditions are met. For example, step 501 determines if a transmit beam forming bit is enabled.

If the transmit beam forming bit is enabled, then step 502 determines if (1) a unicast frame is to be transmitted or (2) a multicast BF_MCAST bit is set (thereby allowing beam forming for multicast) and the transmission is a multicast/broadcast transmission (note that in either case the transmitter communicates with a plurality of receivers).

Note that if a plurality of transmitter processing chains (e.g. processing chains A(T) and B(T) for transmitter 101 in FIG. 1) are used to provide optimal coverage for a multicast/broadcast transmission to a plurality of receivers, then those processing chains can be increased to their maximum power (i.e. their gain can be increased, in the event that the transmitter chain(s) does/do not exceed a regulatory maximum broadcast power). Notably, the parameters for the transmitter processing chains actually appear to be beam forming parameters. Therefore, such a multicast/broadcast transmission can be processed as if it were beam formed, even when it is not actually beam-formed.

Returning to step 502, if (1) or (2) is true, then step 503 determines if the beam forming coefficient enable (BF_COEF_ENABLE) bit is set, thereby indicating that modifications to each of the 52 channels (of signed gain I and Q representing magnitude and phase) are enabled. If the BF_COEF_ENABLE bit is set, then step 504 determines if (1) the pointer is at entry 0 (i.e. the entry for the default parameters) and (2) the packet is not multicast, thereby indicating that beam forming should not be done.

If (1) and (2) of step 504 are false, then step 505 determines which coefficient update bits are enabled. In one embodiment, there are 4 bits for each of the 64 frame types. For example, a first bit BFCOEF_TX_ENABLE_NORMAL could enable transmit coefficients for normal frames, a second bit BFCOEF_TX_ENABLE_SELF_GEN could enable transmit coefficients for auto-generated response frames (i.e. an automatically generated frame sent in response to a received frame, such as an acknowledge (ACK) frame or a clear-to-send (CTS) frame), a third bit BFCOEF_TX_ENABLE_GEN could enable transmit coefficients for generated frames (i.e. a frame which is generated by hardware and sent out before a "real" (data-bearing) data frame is sent out, such as a request-to-send (RTS) frame or a CTS frame), and a fourth bit BFCOEF_TX_ENABLE_MCAST could enable transmit coefficients treat as multicast.

If all conditions (as determined by steps 501-504) were met and beam forming for at least one frame type is enabled (step 505), then step 506 uses beam forming in the manner directed by step 505 during the transmission. Notably, if any condition is not met or if beam forming for no frame types are enabled, then the process immediately returns to step 501 until the next frame is to be transmitted.

Figure 6:
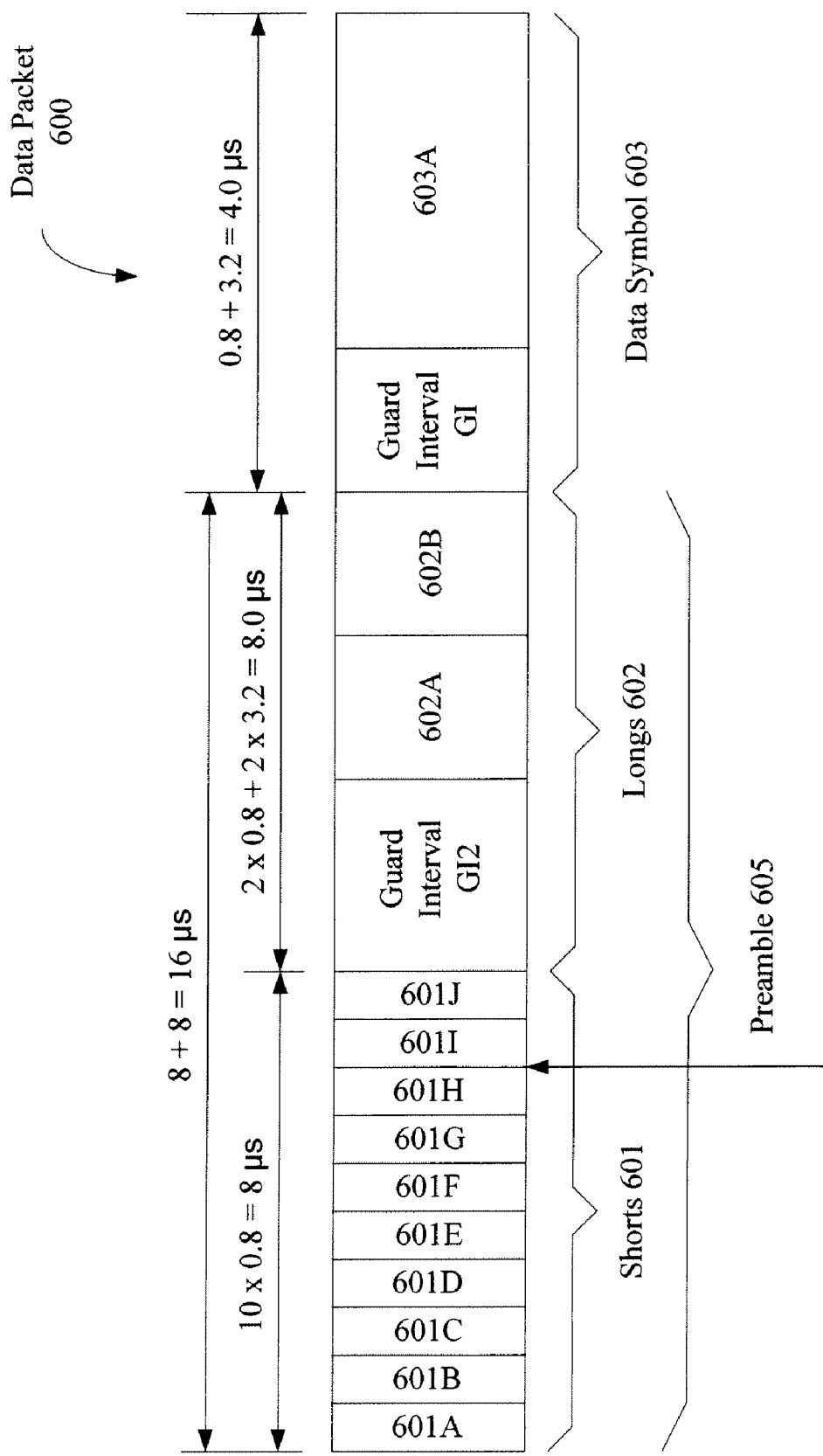
FIG. 6 illustrates an exemplary packet and an associated timeline for fast diversity.

FIG. 6 illustrates a portion of a wireless transmission data packet 600 and its associated timeline. As defined in the 802.11a standard, for example, a preamble 605 of data packet 600 includes 10 "short" identical known symbols 601A-601J (called shorts 601)(total time duration of 8 μs) concatenated to 2 "long" identical known symbols 602A-602B (longs 602) (total time duration of 8 μs). Note that a symbol refers to any waveform in time (e.g. represented as voltage versus time).

Shorts 601 can be used to determine a frequency offset between the oscillators in the receiver and transmitter. Additionally, shorts 601 can be used to provide an initial system time synchronization. Longs 602 can be used to provide channel estimation. Specifically, because longs 602 are known, the receiver can use these symbols to provide rough channel estimations for a subsequent data symbol 603 in the data packet. In this manner, longs 602 can thereby increase the likelihood that the received data symbols can be correctly interpreted. Longs 602 are also called "training" symbols because they can "train" a frequency domain equalizer to learn about channel conditions.

The diversity switches (e.g. diversity switches 103 of FIG. 1) may be controlled in either a "fast" or "slow" manner. In fast diversity, parameters associated with a signal being received (e.g. a received signal strength indicator or "RSSI") may be sampled from each antenna associated with each receive processing chain (e.g. processing chains A(R) and B(R) in receiver 102). A decision can then be made, on a packet by packet basis, as to which antenna will be chosen to receive the remainder of the transmission. In one embodiment, the decision can be made on or before time 610, as shown in FIG. 6.

In contrast, slow diversity involves storing received signal parameters from previous packets, associating the parameters with a selected antenna, and using the parameter history to denote a "default" antenna. In one embodiment, the default antenna selection can be tested by occasionally selecting an other-than-default antenna for parameter collection. In another embodiment, the RSSI measured for each antenna during a fast diversity measurement can be collected and a default antenna can be designated. If the newly collected parameters suggest an other-than-default antenna would be optimal, then that antenna can be made the default antenna.

In one embodiment, software can be used to switch transmit antennas using a key cache. Note that in a transceiver, the transmit antenna is a receive antenna at a different point in time. In a standard transceiver, the receive antenna is also the receive ACK antenna. In accordance with one aspect of the invention, a different antenna can be designated for receiving of the acknowledgement (ACK) signals without changing the transmit (or receive) antenna.

Specifically, the software can replace the current receive ACK antenna data (RAA) in the key cache entry with new receive ACK antenna data (RAA-NEW)(see arrow 202 in FIG. 2). This RAA-NEW would correspond with a potential new transmit antenna. (For example, if T(A1) is the current transmit antenna (TA) as well as the RAA-CUR, then one of T(A2), T(B1), and T(B2) could be designated as RAA-NEW.) Notably, this RAA replacement would not cause the transmit frame to change its designated transmit antenna (TA) data.

However, the updated transmit frame will advantageously trigger the antenna designated by RAA-NEW to receive the ACK signal. Note that a received signal sent from a first antenna to a second antenna should encounter the same path conditions as a transmitted signal from the second antenna to the first antenna. This reciprocity means that if the antenna designated by RAA-NEW successfully receives the ACK signal, then the transmit antenna (TA) in the key cache can be updated to match RAA-NEW. Subsequent transmit frames can be transmitted with the updated transmit antenna.

By assuming that for moderate periods of time (e.g. long enough to transmit or receive several packets), each station uses the same antennas, calculating and updating the beam forming coefficients upon receipt of the ACK signal using the receive ACK antenna (RAA) data, subsequent transmissions can occur on a new transmit antenna using accurate beam forming coefficients.

Note that when first activated, a transceiver has no communication history upon which to base its selection of antennas or beam forming coefficients. Therefore, in some embodiments, a global default arbitrarily selects antennas used for receiving and transmitting. In one embodiment, beam forming can be globally disabled until received signal parameters are collected and beam forming coefficients calculated for a given signal source.

In some embodiments, beam forming and fast diversity may not be compatible. For example, assuming a receiver is sent a beam formed transmission (by means of transmit beam forming) and is permitted to choose between a pair of antennas for receipt of that transmission, the transmitter has no real-time mechanism to alert it to the receiver's actual choice of antenna. Therefore, the transmitter may be potentially using beam forming coefficients for a wrong receiving antenna. Use of the wrong coefficients for an antenna can result in poor performance. In this case, if beam forming is not enabled at the transmitter, the receiver can use fast diversity to ensure the proper antenna is chosen.

Figure 7:
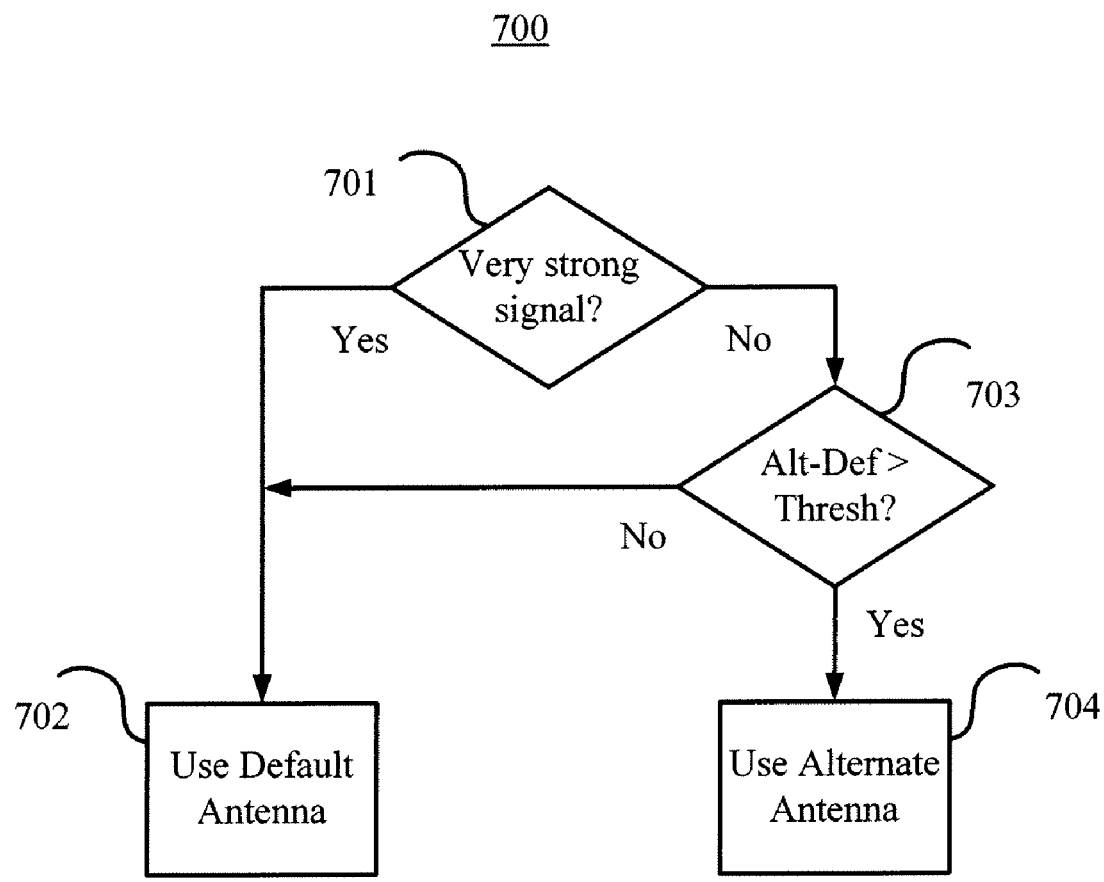
FIG. 7 illustrates an antenna selection technique for selecting either a default antenna or an alternate antenna.

FIG. 7 illustrates an antenna selection technique 700 for selecting a default antenna or an alternate antenna. If a signal is considered very strong as determined in step 701, then any receiving antenna will likely perform well. Therefore, the default antenna (e.g. determined using slow diversity) can be selected in step 702. Note that a signal may be characterized as very strong if during reception, a number of large gain decrease steps must be made sequentially. In some embodiments, three large gain decrease steps can signify a very strong signal.

If the signal is not considered very strong, then parameters associated with the received signal can be collected (e.g. using fast diversity by the time 610 (FIG. 6)) from the receiving antennas. If the difference in the parameters measured from the alternate antenna is greater than a threshold value as determined in step 703, then the alternate antenna can be selected in step 704 to receive the packet associated with the received signal. However, if the difference in the parameters measured from the alternate antenna is not greater than the threshold value, then the default antenna can be selected (step 702).

In one embodiment, the threshold value can be set higher if beam forming has been enabled, thereby effectively biasing the selection of the antenna to the default antenna. The higher threshold setting can be selected such that the increased signal parameters (e.g. RSSI) would be sufficient to overcome the suboptimal performance of using beam forming parameters for the wrong receiving antenna.

Although illustrative embodiments have been described in detail herein with reference to the accompanying figures, it is to be understood that the invention is not limited to those precise embodiments. They are not intended to be exhaustive or to limit the invention to the precise forms disclosed. As such, many modifications and variations will be apparent to practitioners skilled in this art.

Accordingly, it is intended that the scope of the invention be defined by the following Claims and their equivalents.

The invention claimed is:

1. A method for selecting an antenna in a beam forming receiver, the method comprising:
   determining whether a received signal is very strong;
   if the received signal is very strong, then selecting a default antenna, wherein the default antenna is determined using slow diversity; and
   if the received signal is not very strong, then collecting parameters associated with the received signal using receiving antennas;
   if a difference in the parameters measured from an alternate antenna and the default antenna is greater than a threshold value, then selecting the alternate antenna,
   wherein the receiving antennas include the default antenna and the alternate antenna.

2. The method of claim 1, further including:
   if the difference in the parameters measured from the alternate antenna is not greater than the threshold value, then selecting the default antenna.

3. The method of claim 2, wherein the parameters are collected using fast diversity.

4. The method of claim 2, wherein the threshold value is set to bias selecting the default antenna.

5. The method of claim 2, wherein the threshold value can be set higher if beam forming has been enabled.

6. The method of claim 5, wherein a higher threshold setting can be selected such that increased signal parameters are sufficient to overcome suboptimal performance of using beam forming parameters for a wrong receiving antenna.

7. The method of claim 2, wherein a signal is very strong if, during reception, a number of large gain decrease steps are made.

8. The method of claim 7, wherein the number of large gain decrease steps is three.

* * * * *